Figure 1:
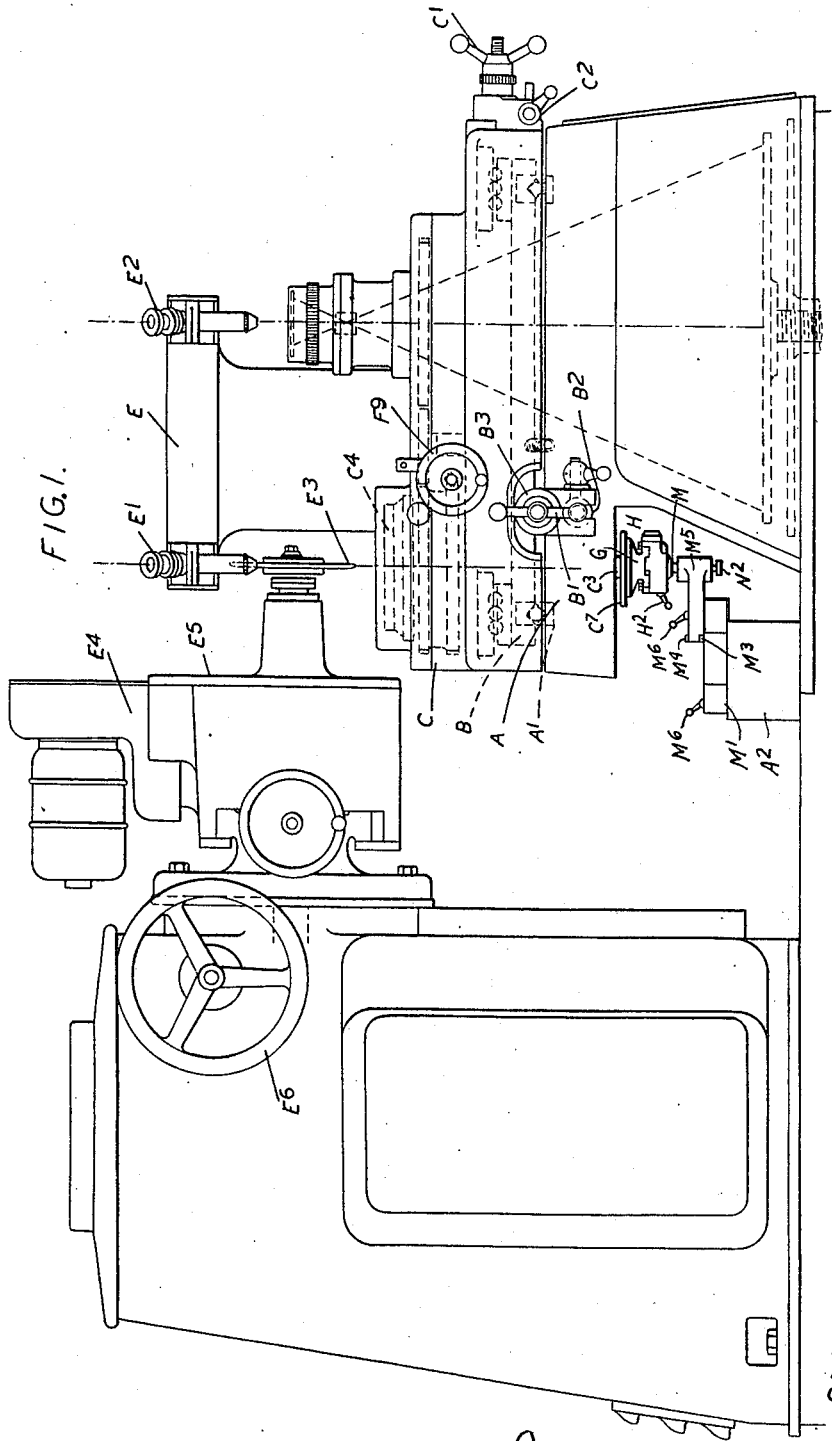

Aug. 10, 1948.  E. A. COOKE  2,446,575
COPYING MACHINE WITH OPTICAL SYSTEM
Filed Sept. 6, 1944  9 Sheets-Sheet 1

INVENTOR
ERNEST A
COOKE
BY
Emery Holcombe & Blair
ATTORNEY

Aug. 10, 1948.   E. A. COOKE   2,446,575
COPYING MACHINE WITH OPTICAL SYSTEM
Filed Sept. 6, 1944   9 Sheets-Sheet 2

INVENTOR
ERNEST A. COOKE
BY Emery Holcombe & Blair
ATTORNEY

Aug. 10, 1948. E. A. COOKE 2,446,575
COPYING MACHINE WITH OPTICAL SYSTEM
Filed Sept. 6, 1944 9 Sheets-Sheet 4

INVENTOR
ERNEST A. COOKE
BY
Emery Holcombe & Blair
ATTORNEY

Aug. 10, 1948.  E. A. COOKE  2,446,575
COPYING MACHINE WITH OPTICAL SYSTEM
Filed Sept. 6, 1944  9 Sheets-Sheet 5

ERNEST A. COOKE INVENTOR
BY
Emery Holcombe & Blair
ATTORNEY

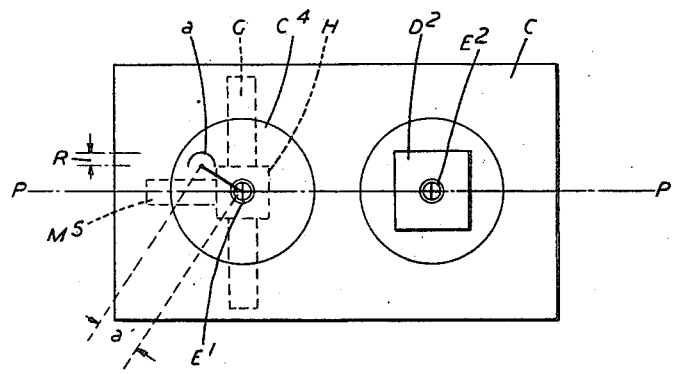
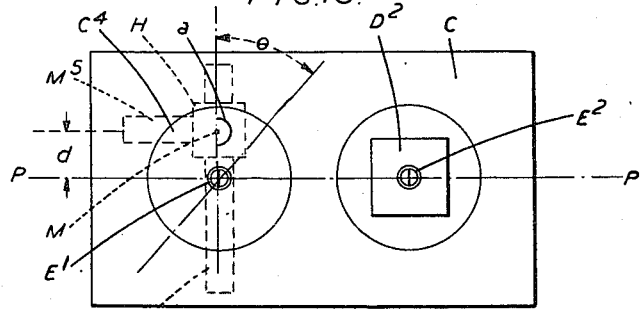
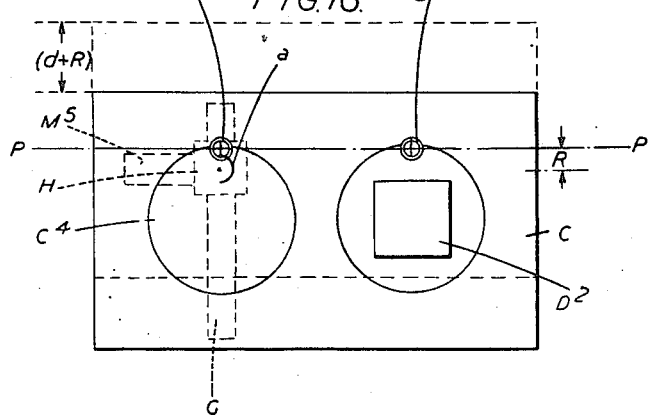

Aug. 10, 1948.  E. A. COOKE  2,446,575
COPYING MACHINE WITH OPTICAL SYSTEM
Filed Sept. 6, 1944  9 Sheets-Sheet 8
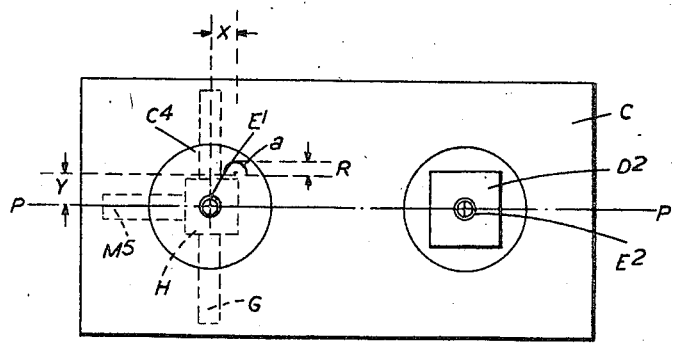
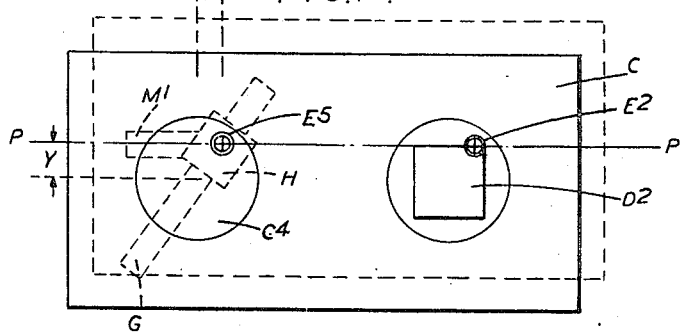
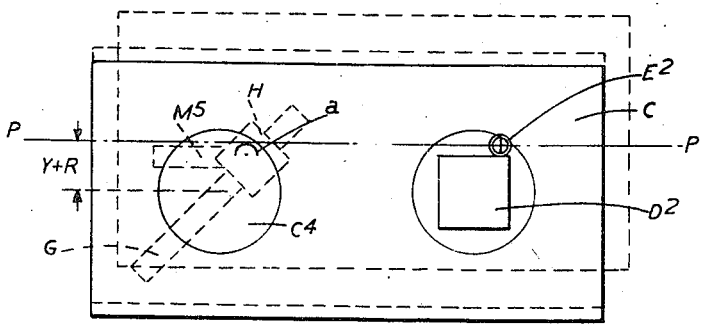
INVENTOR
ERNEST A. COOKE
BY
Emery Holcombe & Blair
ATTORNEY

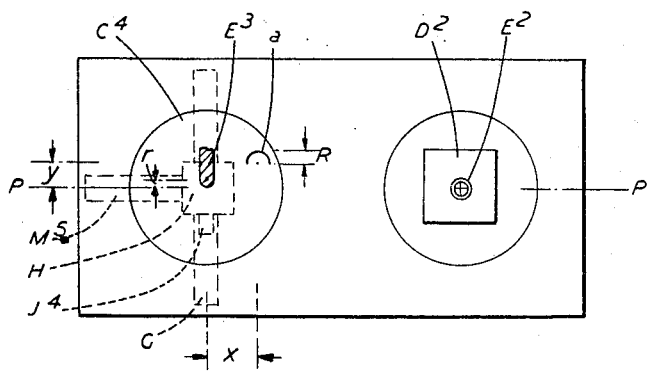
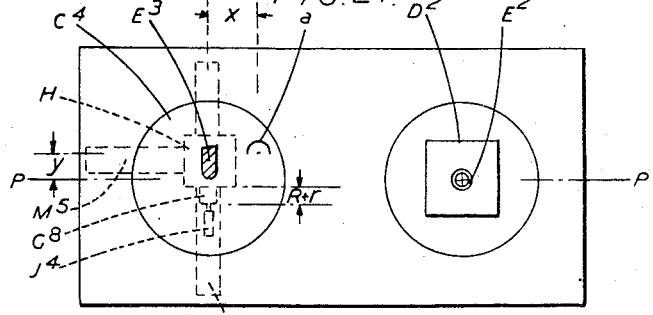
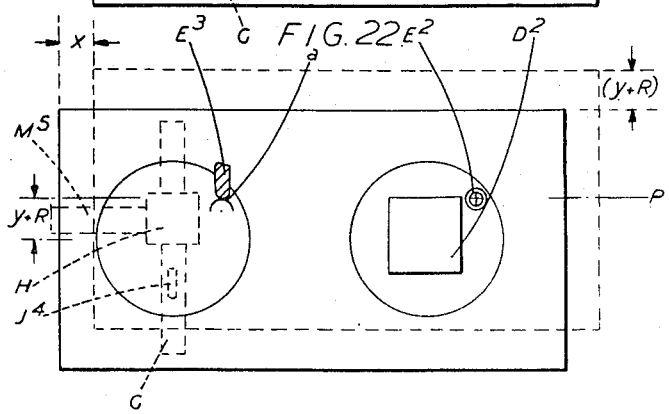

UNITED STATES PATENT OFFICE 2,446,575

COPYING MACHINE WITH OPTICAL SYSTEM

Ernest Albert Cooke, Leicester, England, assignor to Taylor, Taylor & Hobson Limited, Leicester, England, a company of Great Britain Application September 6, 1944, Serial No. 552,915
In Great Britain July 15, 1943

31 Claims. (Cl. 51—165)

This invention relates to apparatus for setting radii of circular arcs to be generated by copying machines of the kind comprising a tool support, a work support translationally and rotationally adjustable relatively to the tool support, and means for setting the radius of an arc to be generated comprising a radius arm arranged to swing about an axis so arranged that the arm represents a radius of the work support for all translational and rotational positions of adjustment thereof, and a follower adjustable along the arm and adapted to be engaged by an anchorage device connected to the fixed part of the machine so that the centre of the arc to be generated can be located, in space, by the anchorage device whereby the said movements of the work support relatively to the tool support will be constrained to take place about such centre.

One example of such copying machine is described in the specification of the United States of America Patent No. 2,206,587 standing in the name of the present applicant, wherein the machine comprises a tool support, a work support, a copy support, and means whereby the work and copy supports move in synchronism both rotationally and translationally so that the relative movement between the work and tool is a reproduction of the relative movement between the copy support and a datum point or origin, the anchorage device associated with the radius arm (which is associated with the copy support) locating a point in space about which the copy support is constrained to move. The actual centre of the arc on the work table is thus fixed in space at the correct distance from the tool so that translational and rotational movement of the work and copy supports causes the tool to generate the desired arc on the work.

Apparatus, according to the present invention, for setting radii of circular arcs on copying machines of the kind referred to comprise a linear dimension gauge carried by the radius arm and having a feeler member which acts between the follower and an abutment also carried by the arm, the gauge measuring the displacement of the follower with respect to the axis of rotation of the radius arm.

Preferably, the linear dimension gauge is formed as a unit with the follower, and means are provided whereby the follower unit can be locked to the radius arm in any position of adjustment thereon. The follower may be adjusted along the radius arm by a spindle carried by the radius arm, means being provided whereby engagement between the follower and the spindle can be established at will.

In a preferred arrangement, the abutment is adjustable along the radius arm relatively to the follower, and can be locked to the arm in any position of adjustment thereon, the abutment conveniently carrying an adjustable stop for engaging the feeler member of the linear dimension gauge.

Any suitable linear dimension gauge may be employed, but in the preferred construction the feeler member of the gauge comprises a longitudinally movable rod whose movement in one direction or the other operates one or other of two levers which act respectively on the two relatively movable elements of a device for controlling an indicating instrument. The relative movement of the said two elements may be mechanically transmitted to the indicating instrument, but it is preferred to employ electrical transmission by arranging the two levers to act respectively on the coil element and on the armature element of an electromagnetic control device, comprising two relatively movable elements carried by a cradle connected to the follower by two parallel spring ligaments so that whilst the cradle is free, within limits, to move longitudinally it will always remain parallel to itself. Similarly, the fulcrums of the two levers may be constituted by spring ligaments, the levers cooperating with suitable stops which permit the levers to swing about their fulcrums respectively in two mutually reversed directions only. Thus, when one lever is actuated to operate the associated element, the other lever acts as a fixed abutment preventing simultaneous movement of the other element in the same direction.

Figure 2:
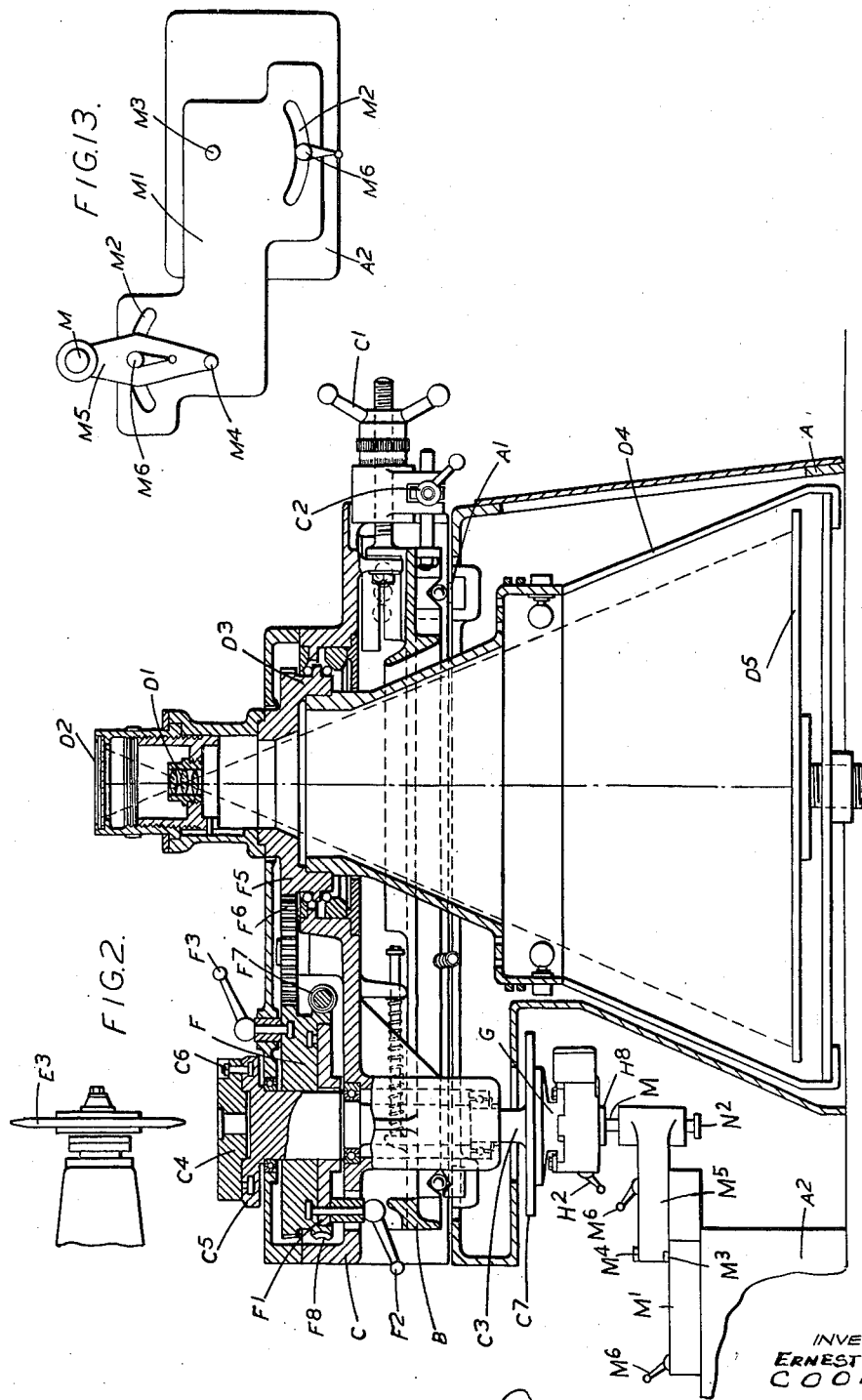
Figure 3:
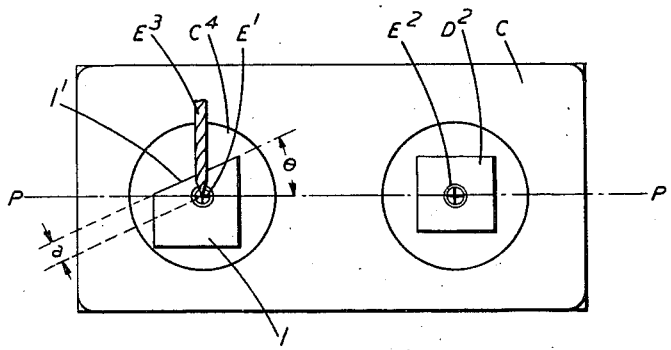
Figure 4:
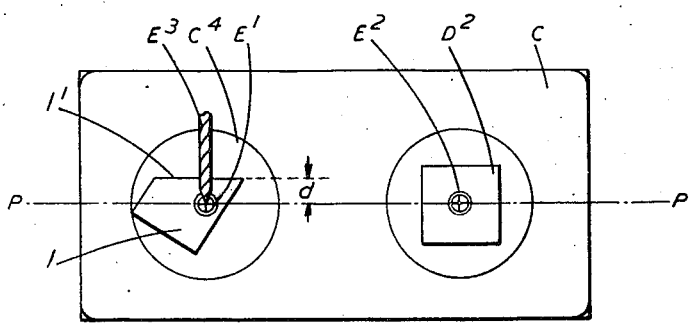
Figure 5:
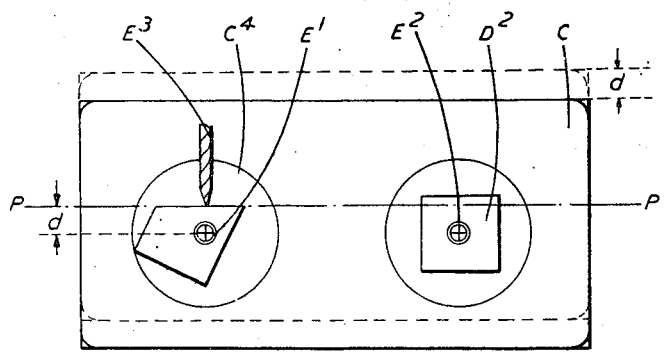
Figure 6:
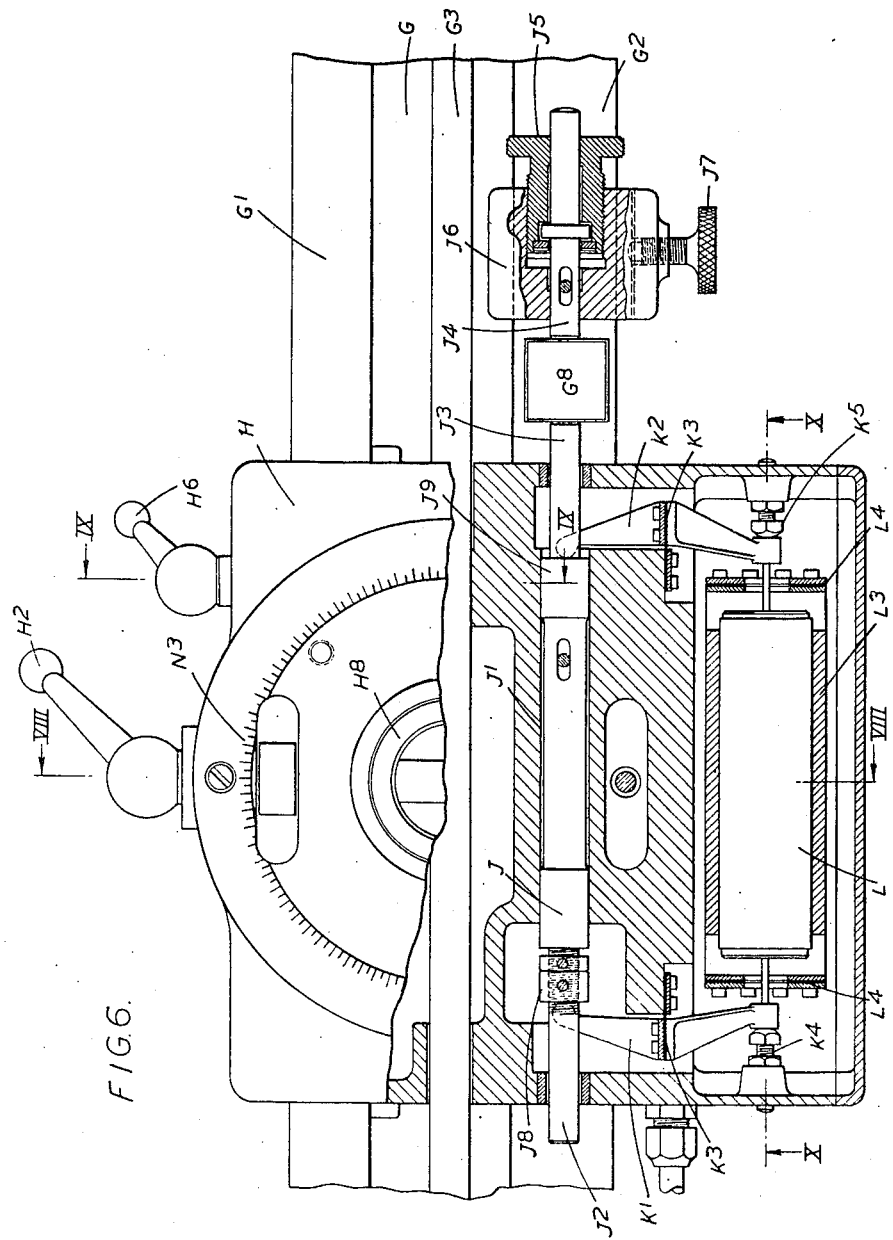
Figure 11:
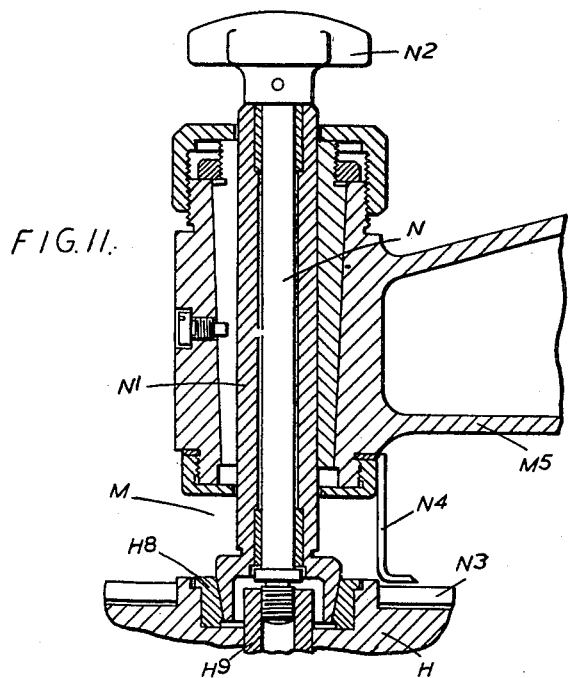
Figure 12:
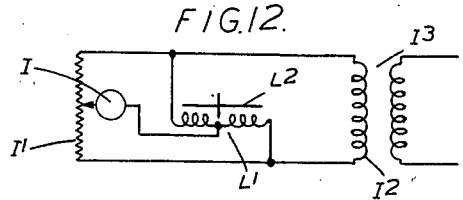
Figure 7:
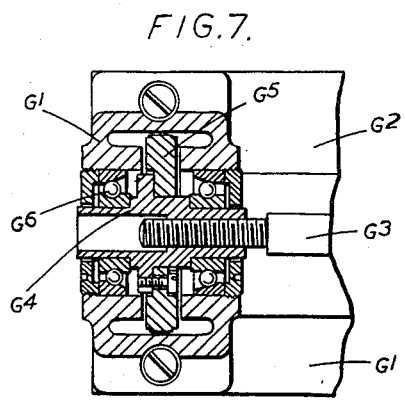
Figure 8:
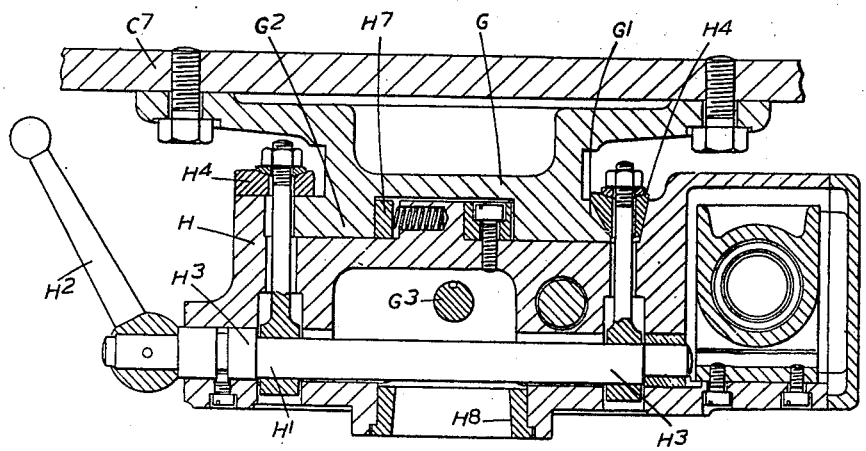
Figure 10:
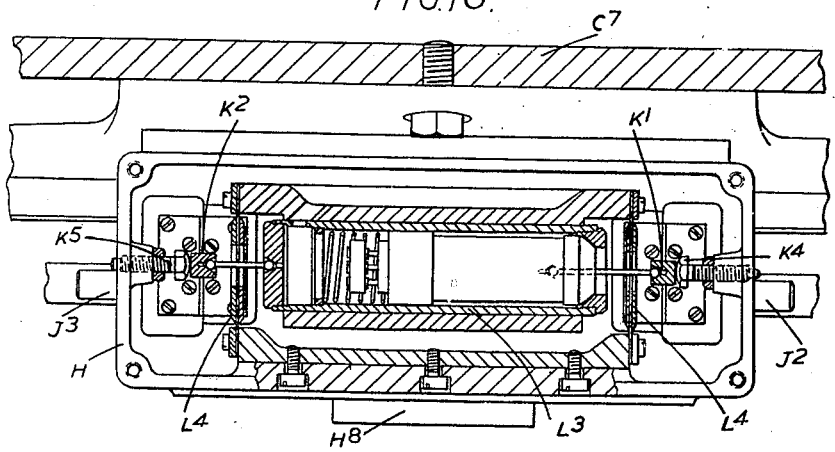
Figure 9:
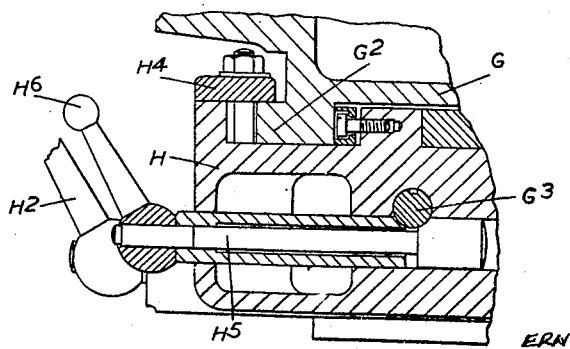

One construction embodying the invention as applied to a projection copying machine is shown, by way of example, in the accompanying drawings, in which Figure 1 shows the machine in front elevation, Figure 2 is a vertical section of Figure 1, but omitting the tool support and on a larger scale, Figures 3, 4 and 5 indicate, diagrammatically, the three successive stages of adjustment for straight-line grinding, Figure 6 shows, partly in section and in bottom plan, the jockey unit indicated in Figures 1 and 2, Figure 7 is a section through the adjusting head on the radius arm, Figure 8 is a section on the line VIII—VIII of Figure 6 but with the jockey unit in its normal position as shown in Figs. 1 and 2, Figure 9 is a similar section on the line IX—IX of Figure 6, Figure 10 is a similar section on the line X—X of Figure 6, Figure 11 shows the anchoring spigot in vertical section, Figure 12 is a diagram of electric connections for the electromagnetic control device, Figure 13 illustrates diagrammatically and in plan, the linkage support for the spigot shown in Figure 11, Figures 14, 15 and 16 indicate diagrammatically three stages of adjustment which are effected for setting the apparatus in accordance with a convex circular arc, which is to be generated by gyratory grinding, from basic data represented by polar coordinates, Figures 17, 18 and 19 similarly illustrate the settings for a circular convex arc represented by Cartesian coordinates and Figures 20, 21 and 22 are similar representations in respect of a convex circular arc represented by Cartesian coordinates but which is to be generated by translatory grinding.

As shown in Figures 1 and 2 the copying machine comprises a fixed base A provided with ball tracks $A^1$ the balls in which engage similar tracks formed beneath a basic slide B whose upper surface has two further ball tracks at right angles to those beneath the slide B. The balls on the upper surface of the basic slide B engage tracks in the lower surface of an upper slide C which constitutes the main carriage. The main carriage C can thus be translationally adjusted in all directions in the horizontal plane whilst remaining parallel to itself for all such positions of adjustment. The basic slide B and the main carriage C are adjusted by two feed screws operated by nuts $B^1$, $C^1$ respectively, locking collars $B^2$, $C^2$, being provided whereby the feed screws can be locked against effective adjustment at will, thereby locking the corresponding slide B or carriage C against translational movement.

The carriage C has, near one end, upper and lower bearings for a vertical shaft $C^3$ carrying a work table $C^4$ which can be angularly adjusted about the said shaft as described below, the carriage C having, near its other end, bearings for a copy shaft $D^3$ which is hollow throughout its length and carries a translucent screen $D^2$ and a projection objective $D^1$. A light framework $D^4$ extends downwards from the copy shaft $D^3$ to support a copy table $D^5$ for carrying a drawing or other flat copy when the apparatus is to be employed for reproducing a predetermined outline on the work, by projection copying, as described in the specification of the United States of America Patent No. 2,206,587. For this purpose a bracket E mounted on the fixed base A of the machine carries a work microscope $E^1$ and a copy microscope $E^2$, whose optical axes lie in a vertical plane, hereinafter referred to as the "primary plane," designated P—P, with which the main carriage C remains parallel for all positions of adjustment of the carriage.

The tool consists of an abrasive wheel $E^3$ rotated about an axis parallel to the primary plane and to the horizontal top of the carriage C, the tool support $E^4$ being normally reciprocated on guides $E^5$ in a direction at right angles to the said horizontal plane so that the work on the work table $C^4$ will be ground throughout its thickness. The guides $E^5$ can be tilted about a horizontal axis (passing through the operative edge of the grinding wheel $E^3$) by means of a hand wheel $E^6$ so as to vary the angle of reciprocation of the grinding wheel for imparting a rake to the work.

The work shaft $C^3$ has, at its upper end, a radial flange $C^5$ which can be coupled to or uncoupled from a drum F by means of a locking bolt $F^2$, cooperating with a flange $F^1$ secured to the shaft $C^3$, the drum F, when released being rotatable about the work shaft $C^3$. Similarly, the drum F can be coupled to or uncoupled from the carriage C by means of a locking bolt $F^3$, whilst the work table $C^4$ can be coupled to or uncoupled from the flange $F^1$ by means of a locking bolt $C^6$. The copy shaft $D^3$ is also furnished with a toothed drum $F^5$ which is coupled to the drum F through an idler pinion $F^6$. Rotary movement is imparted to the drum F by means of a worm $F^7$ engaging a rim $F^8$ on the drum F and operated by a hand wheel $F^9$. Thus, when the work table $C^4$ is coupled to the drum F, movements of the table $C^4$, both rotational and translational, will be exactly equal to those of the image or copy as projected in the screen $D^2$ by the projection objective $D^1$. The distance between the optical axes of the work microscope $E^1$ and copy microscope $E^2$ is exactly equal to the distance between the vertical axes of rotation of the work shaft $C^3$ and copy shaft $D^3$, so that when the carriage C is in its zero position the optical axes of the work and copy microscopes are in accurate alignment with the axes of rotation of the work and copy shafts, all these four axes then lying in the primary plane.

For normal copying work, therefore, the carriage C is adjusted by means of the two nuts $B^1$, $C^1$ for translational adjustment of the work, and by the hand wheel $F^9$ for rotational adjustment thereof, to cause the copy microscope $E^2$ to traverse the outline on the screen $D^2$, the grinding wheel being at the same time rotated and reciprocated so that the work is ground exactly in accordance with the outline of the projected image. Since the image is itself a scale reproduction of the copy, the work will be ground to the appropriate scale ratio relatively to the copy. When thus grinding from a copy the drum F, though coupled to the worm $F^7$ and to the work table, will be freed from the carriage C by releasing the locking bolt $F^3$, the table $C^4$ being locked to the flange $F^1$ by the locking bolt $C^6$.

The machine so far described may also be used for generating straight lines on the work. To this end, assuming that a straight line $l^1$ (Figure 3) is to be ground on the work piece $l$, the work table $C^4$ is turned by means of the worm $F^7$ through the angle $\theta$ i. e. until the line $l^1$ to be ground is parallel to the primary plane P—P as shown in Figure 4. The nut $B^1$ is then adjusted until the axis of the work shaft $C^3$ lies at the distance $d$ from the primary plane P—P, this measurement being read from a vernier scale $B^3$ associated with the nut $B^1$. The parts are now in the positions shown in Figure 5, so that by locking the basic slide B by means of the locking ring $B^2$ the carriage C can be traversed by means of the nut $C^1$ so that the work moves past the tool $E^3$ parallel to the primary plane P, that is to say parallel to the length of the straight line $l^3$ to be ground.

By adding to the machine apparatus for setting radii of circular arcs, in accordance with the invention, the machine can also be employed for generating such arcs from basic data. Since the movements of the copy table and work table, both translational and rotational, are exactly equal and synchronised, the apparatus for setting the radii of circular arcs may be associated either with the work shaft $C^3$ or with the copy shaft $D^3$, but in order to avoid congestion at and adjacent to the copy table it is preferred to arrange the apparatus in association with the work shaft $C^3$. For the purpose of circular arc grinding it is necessary to anchor, in space, the point on the work table $C^4$ which constitutes the centre of the arc, and to locate this anchorage point at a distance from the operative point of the grinding wheel $E^3$ which is exactly equal to the radius of the arc to be ground.

As shown in Figures 1 and 2 the work shaft $C^3$ is extended downwards and has, at its lower end, a radial flange $C^7$ to which is detachably secured a radius arm G which, when in position, extends horizontally adjacent to the base A with the longitudinal centre line of the arm G intersecting the axis of rotation of the work shaft $C^3$ and the work table $C^4$. The arm G thus represents a diameter of the work table $C^4$, i. e. radius on each side of the axis of rotation of the work shaft $C^3$. As shown in Figure 6 the radius arm G is furnished with longitudinal guides $G^1$, $G^2$ along which can be adjusted a jockey unit comprising a casing H through which extends freely a micrometer spindle or draw-bar $G^3$ in screwthreaded engagement with an internally threaded nipple $G^4$ (Figure 7) furnished with a knurled ring $G^5$ and rotatable in a bearing $G^6$ carried by an end piece $G^7$ of the radius arm G. Rotation of the ring $G^5$ thus causes longitudinal adjustment of the draw-bar $G^3$. The jockey unit H carries a latching spindle $H^1$ (Figure 8) operated by a lever $H^2$ after the manner of a turret lock, cam surfaces $H^3$ on the spindle $H^1$ acting through gibs $H^4$ on the guides $G^1$, $G^2$ so that the jockey unit H can be firmly locked to the radius arm G in any position of adjustment along the arm A second latching spindle $H^5$ (Figure 9) on the jockey unit H, when actuated by a lever $H^6$, bears against the micrometer spindle or draw-bar $G^3$ so as to lock the unit H to the draw-bar. Thus, when the jockey unit is locked to the draw-bar but unlocked from the radius arm G, fine adjustment of the jockey unit can be effected by turning the micrometer ring $G^5$. An additional gib $H^7$ being spring pressed into engagement with the radius arm G so as to eliminate shake while the main locking gibs $H^4$ are in the released condition. For the purpose described below, the jockey unit H has in its lower surface a tapered socket $H^8$ containing an internally screwthreaded tube $H^9$ (Figure 11) the axis of the socket and tube intersecting the longitudinal axis of the radius arm G, that is to say for the central or zero position of adjustment of the jockey unit H the axis of the socket $H^8$ will lie in alignment with the axis of rotation of the work shaft $C^3$.

Formed in the body of the jockey unit H to one side of the socket $H^8$, as shown in Figure 6, and extending parallel to the radius arm G, is a passage $J^1$ in which is freely movable the feeler rod J of a linear dimension gauge as described in the specification of the United States of America patent application Serial No. 543,536, dated July 5, 1944, now Patent No. 2,412,127, dated December 3, 1946. The two ends $J^2$, $J^3$ of the rod J project from opposite sides of the jockey unit H respectively so that either end can cooperate with a micrometer stop constituted by a stud $J^4$ longitudinally adjustable, by a micrometer head $J^5$, in an abutment block $J^6$ carried by and adjustable along the guide $G^2$, a locking stud $J^7$ being provided on the abutment block $J^6$ for locking the block to the guide $G^2$ in any desired position of adjustment thereon.

The feeler rod J carries two radial flanges or collars $J^8$, $J^9$ which cooperate respectively with the adjacent ends of the two rocking levers $K^1$, $K^2$ fulcrumed on the jockey unit H within the body thereof by two spring ligaments $K^3$, the other ends of the levers $K^1$, $K^2$ acting respectively through tappet rods $L^7$, $L^8$ on the tubular housing $L^3$ for the coil element and on the armature element $L^2$ of an electromagnetic device L for controlling an indicating instrument I arranged outside the fixed base of the machine. The coil element comprises two balanced coils $L^1$, $L^5$ (Figure 12) carried by a tubular housing $L^3$ having an axial guide $L^6$ for guiding the armature $L^2$ extending axially therein, the tubular unit $L^3$ being supported from the body of the jockey unit H by two parallel spring ligaments $L^4$ (Figure 10) so that whilst the tubular unit $L^3$ is free, within limits, to move in the direction of its length, it will always remain parallel to itself and to the direction of longitudinal movement of the feeler rod J. The ends of the rocking levers $K^1$, $K^2$ adjacent to the tubular unit $L^3$ cooperate with two independently adjustable abutment stops $K^4$, $K^5$ so that when the feeler rod J moves to the left, as viewed in Figure 6, the lever $K^1$ is turned in the counter clockwise direction about its fulcrum but the stop $K^5$ prevents similar angular movement of the lever $K^2$ which thus acts as an abutment. Similarly, when the feeler rod moves to the right, the lever $K^2$ turns in the clockwise direction and the lever $K^1$ acts as an abutment. The resultant movement between the armature $L^2$ and coils $L^1$, $L^5$ of the electromagnetic control device L causes differential variation of the reluctance of the magnetic circuits of the balanced coils $L^1$, $L^5$ thus causing corresponding variation of the reading on the instrument I which is connected between a tapping point on a resistance $I^1$ and the point of interconnection of the two coils which are arranged across the secondary circuit $I^2$ of a transformer $I^3$ whose primary is supplied from a suitable source of alternating current. The operation of the electromagnetic control device L may be as described in the specification of British Patent No. 556,607.

For the purpose of anchoring the centre of the tapered socket $H^8$, in space, in the position of adjustment, a spigot M (Figure 11) adapted to fit within the socket $H^8$ is carried by a support comprising a primary link $M^1$, as shown in Figure 13, having near each of its ends an arcuate slot $M^2$ struck respectively from centres coaxial with primary and secondary pivots $M^3$, $M^4$. The primary pivot $M^3$ is connected to a platform $A^2$ on the fixed base A of the machine, and a secondary link $M^5$, mounted to turn on the secondary pivot $M^4$, carries at its opposite end the spigot M which is shown in detail in Figure 11. The spigot M is thus adjustable in all directions horizontally within the limits of adjustment of the links which can be locked, at will, against angular movement about the pivots by lock nuts $M^6$ engaging studs which extend freely through the arcuate slots $M^2$. As shown in Figure 11, the spigot comprises an inner part or spindle N whose upper end is screw threaded to engage the internal thread of the tube $H^9$ within the socket $H^8$ of the jockey unit H. The spindle N is rotatable within an outer part or sleeve $N^1$ journalled in the secondary link $M^5$ and whose upper end is tapered to fit into the socket $H^8$, the lower end of the spindle N having a tension head $N^2$ which acts against the lower end of the sleeve $N^1$ thus driving the upper or tapered end of the sleeve into the socket $H^8$.

For the purpose of setting the radii of circular arcs to be generated by the tool on the work either polar coordinates or Cartesian coordinates may be utilised. Moreover, the apparatus may be employed either for translatory or gyratory grinding. By "gyratory grinding" is meant a swinging movement of the work about a predetermined axis fixed in space at the centre of the arc to be ground, whilst by "translatory grinding" is meant translatory movement of the work in space so that all points on the work describe the same path.

One example of the gyratory circular arc grinding from basic data represented by polar coordinates is shown in Figures 14 to 16. Assuming that the arc $a$ to be ground has a radius R and whose centre of curvature is given by polar coordinates, namely an angle $\theta$ and the radial distance $d$ from the centre of the work, the carriage C is brought into its zero position with respect to the primary plane P—P, that is to say with the axes of rotation of the work and copy shafts in alignment with the optical axes of the work microscope and copy microscope. The parts are now in the positions shown in Figure 14, and accuracy of the zeroing can be tested by inserting the spigot M in the socket $H^8$ and, having clamped the locks $M^6$, swinging the work and copy shafts to and fro about their axes by means of the hand wheel $F^9$, the drum F being free from the carriage C but locked to the flange $C^5$ and the work table $C^4$. If such oscillation causes the datum point on the screen $D^2$ to move relatively to the cross lines on the copy microscope, zeroing is inaccurate and correction is made by adjusting the carriage C until the said datum point remains stationary during angular movement of the work table $C^4$. The centre of the spigot M is now accurately in the zero position where it is firmly locked by the nuts $M^6$ and, having released the work table $C^4$ from the shaft $C^3$ and locked the jockey unit H to the radius arm G by means of the locking lever $H^2$, the radius arm G is turned into its zero position which is at right angles to the primary plane, and can be read off a protractor scale $N^3$ (Figure 11) on the jockey unit H in cooperation with a pointer $N^4$ carried by the link $M^5$. The parts are now in the zero position with respect to the primary plane P as shown in Figure 14.

The abutment block $J^6$ is now moved along the radius arm G until the micrometer stop $J^4$ bears against the adjacent end of the feeler rod J, the block $J^6$ being then locked by means of the stud $J^7$ and the micrometer head $J^5$ adjusted until the instrument I reads zero. The spigot M having been removed from the socket $H^8$ the lever $H^2$ is released so that the jockey unit H is free both from the guides $G^1$, $G^2$ and from the draw bar $G^3$, and a gauge pack $G^8$ (Figure 6) having the dimension $d$ is inserted between the feeler rod J and the micrometer stop $J^4$. This causes the jockey unit to be moved along the radius arm through a distance roughly equal to $d$, away from the operator, and final adjustment is effected by locking the jockey unit H to the draw-bar $G^3$ (by means of the nut $H^6$) and turning the knurled ring $G^5$ until the instrument I again reads zero. The socket $H^8$ is now accurately at a distance $d$ from the centre of the work table and the jockey unit is firmly clamped to the radius arm G by means of the nut $H^2$. The spigot M is now reinserted in the socket $H^8$ and, having locked the links $M^1$ and $M^5$ against angular movement and tightened the head $N^2$ of the spigot M, the work table is turned about its centre through the angle $\theta$, the protractor $N^3$ being used to measure this angle. The centre of the circular arc $a$ to be generated now lies in vertical coincidence with the axis of the spigot M and at a distance $d$ from the centre of the work table and the primary plane P—P, the parts now being in positions shown in Figure 15. Having relocked the work table $C^4$ to the work shaft $C^3$ the locks $M^6$ of the spigot support are released and the nut $B^1$ is operated so as to move the basic slide B and the carriage C towards the operator through a distance $(d+R)$ whereby the parts are brought into the positions shown in Figure 16, namely with the centre of the arc $a$ at a distance R from the primary plane containing the operative edge of the tool which is represented in Figures 14 to 16 by the cross lines of the work microscope $E^1$. The locks $M^6$ of the spigot support are now tightened and gyratory grinding can take place, about the axis of the spigot M, by operating the nuts $B^1$ and $C^1$. For gyratory grinding of a concave arc the procedure is the same except that instead of moving the carriage towards the operator through a distance $(d+R)$ the carriage is adjusted through a distance $(d-R)$.

In order to generate, by gyratory grinding a convex circular arc $a$ whose centre is represented by the Cartesian coordinates $x$ and $y$ the parts are zeroed as above described and the shaft $C^3$ is locked to the drum F by the lock $F^2$, the spigot M being inserted in the socket $H^8$ and the spigot linkage locked. Having thus brought the spigot M accurately coaxial with the work shaft $C^3$ in the primary plane P—P the work table $C^4$ is locked to the carriage C by the lock $F^3$ and the shaft $C^3$ is released from the drum F, the parts being now in the position shown in Figure 17. Having released the jockey unit H from the radius arm G the coordinates $x$ and $y$ are set by successively utilising the nuts $B^1$ and $C^1$ in association with their micrometer scales. The jockey unit H is then reclamped to the radius arm G, the work shaft $C^3$ is locked to the drum F and the linkage of the spigot M is released, the parts now being in the positions shown in Figure 18, i. e. with the axis of the socket $H^8$ accurately in alignment with the centre of the arc $a$ to be ground and in alignment with the cutting edge of the tool as represented by the work microscope $E^1$. Since, however, grinding must take place in the primary plane P—P, the nut $B^1$ is adjusted to move the basic slide B and the carriage C through the distance R towards the operator after which the primary plane P—P is tangential to the arc $a$ as shown in Figure 19. The micrometer scale associated with the nut $B^1$ now reads $(y+R)$ whilst that associated with the nut $C^1$ reads $x$. Having reclamped the linkage of the spigot M and released the drum F from the carriage C, gyratory grinding can proceed about the axis of the spigot M. For gyratory grinding of a concave arc whose centre is represented by the Cartesion coordinates $x$ and $y$ the procedure is the same except that instead of setting the coordinate $(y+R)$ the coordinate $(y-R)$ is set on the slide B.

For the purpose of generating by translatory grinding, a convex arc of radius R whose centre is given by Cartesian coordinates $x$ and $y$ the parts are zeroed in the primary plane P—P with the shaft $C^3$ locked to the drum F, the spigot M being then coaxial with the work shaft $C^3$ whilst the instrument I reads zero and the spindle J⁴ abuts against the adjacent end of the gauge feeler rod J. Having clamped the drum F to the carriage C the linkage of the spigot M is released though the spigot remains in the socket H³, the parts being now in the position shown in Figure 20.

The jockey unit H is now released from the radius arm G and a gauge block G⁸ having the dimension $(R+r)$ is inserted between the spindle J⁴ and the feeler rod J so that when the jockey unit has been reclamped to the radius arm G with the instrument I again reading zero, the jockey unit will have been adjusted, away from the operator, through the radius R of the arc $a$ plus the radius $r$ of the cutting edge of the tool. The parts are now in the positions shown in Figure 21. Having set the coordinates $x$ and $(y+R)$ by means of the nuts B¹ and C¹ and their associated micrometer scales, so as to bring the parts into the positions as in Figure 22, the linkage of the spigot M is relocked and the shaft C³ is released from the drum F after which translatory grinding can proceed.

For translatory grinding of a concave arc the procedure is the same as that described with reference to Figures 20 to 22, except that instead of setting the coordinate $(y+R)$ the coordinate $(y-R)$ is set on the slide B.

It will be appreciated that the construction described is given by way of example only and that details both of arrangement and construction may be modified to suit requirements. For example, instead of mounting the radius arm beneath the work table, it may be found more convenient to provide the upper end of the copy shaft with a flange or socket for attachment of the radius arm thereto. Further, instead of the jockey unit having a socket for engagement by an anchorage spigot, the supporting linkage may have a part furnished with a boss or socket for cooperating with a spigot carried by the jockey unit. Since the bracket or linkage carrying the anchorage spigot is bodily adjustable relatively to the fixed frame of the machine the zero of the protractor on the radius arm will tend to alter slightly for different radii settings. This error, howover, can be cancelled by an allowance as a result of initial observation.

What I claim as my invention and desire to secure by Letters Patent is:

1. A copying machine comprising a supporting base, a tool support carried by the base, a work support angularly adjustable about a work axis on said base, means for translationally adjusting the work support relatively to the tool support, and apparatus for setting the radii of circular arcs to be generated by the tool on the work and comprising a radius arm extending radially with respect to, and angularly movable about, an axis on the base representing the work axis, means whereby the radius arm is constrained to move both angularly and translationally as a unit with the work support, a follower adjustable along the radius arm, an anchoring device carried by the base, means for adjusting the anchoring device relatively to the base and for locking the device in the desired position of adjustment, means on the follower for engaging the anchoring device which thus locks the follower against translational adjustment relatively to the location determined by the anchoring device, a linear dimension gauge carried by the follower, a feeler member carried by the follower and movable relatively thereto, an abutment carried by the radius arm, said feeler member cooperating with the abutment, and means whereby the gauge is controlled in accordance with the movement of the feeler member relatively to the follower.

2. A copying machine comprising a supporting base, a tool support carried by the base, a work support angularly adjustable about a work axis on said base, means for translationally adjusting the work support relatively to the tool support, and apparatus for setting the radii of circular arcs to be generated by the tool on the work and comprising a radius arm extending radially with respect to, and angularly movable about, an axis on the base representing the work axis, means whereby the radius arm is constrained to move both angularly and translationally as a unit with the work support, a follower adjustable along the radius arm, an anchoring device carried by the base, means for adjusting the anchoring device relatively to the base and for locking the device in the desired position of adjustment, means on the follower for engaging the anchoring device which thus locks the follower against translational adjustment relatively to the location determined by the anchoring device, a linear dimension gauge formed as a unit with the follower, means for locking the follower unit to the radius arm in any position of adjustment of the follower unit along said arm, an abutment carried by the radius arm, a feeler member carried by the follower unit and movable relatively thereto, the feeler member cooperating with the abutment on the radius arm, and means whereby the gauge is controlled in accordance with the movement of the feeler member relatively to the follower unit.

3. A copying machine comprising a supporting base, a tool support carried by the base, a work support angularly adjustable about a work axis on said base, means for translationally adjusting the work support relatively to the tool support, and apparatus for setting the radii of circular arcs to be generated by the tool on the work and comprising a radius arm extending radially with respect to, and angularly movable about, an axis on the base representing the work axis, means whereby the radius arm is constrained to move both angularly and translationally as a unit with the work support, a follower adjustable along the radius arm, an anchoring device carried by the base, means for adjusting the anchoring device relatively to the base and for locking the device in the desired position of adjustment, means on the follower for engaging the anchoring device which thus locks the follower against translational adjustment relatively to the location determined by the anchoring device, a linear dimension gauge carried by the follower, a feeler member carried by and movable relatively to the follower, an abutment carried by the radius arm, said feeler member cooperating with the abutment, a spindle longitudinally adjustable on the radius arm and engaging the follower, means for locking the follower to and unlocking it from the spindle at will, and means whereby the gauge is controlled in accordance with the movement of the feeler member relatively to the follower.

4. A copying machine comprising a supporting base, a tool support carried by the base, a work support angularly adjustable about a work axis on said base, means for translationally adjusting the work support relatively to the tool support, and apparatus for setting the radii of circular arcs to be generated by the tool on the work and comprising a radius arm extending radially with respect to, and angularly movable about, an axis on the base representing the work axis, means whereby the radius arm is constrained to move both angularly and translationally as a unit with the work support, a follower adjustable along the radius arm, an anchoring device carried by the base, means for adjusting the anchoring device relatively to the base and for locking the device in the desired position of adjustment, means on the follower for engaging the anchoring device which thus locks the follower against translational adjustment relatively to the location determined by the anchoring device, a device for locking the follower to the radius arm in any position of adjustment thereon, a spindle carried by the radius arm and longitudinally adjustable relatively thereto, a device for locking the follower to said spindle in any desired position of adjustment relatively thereto, a linear dimension gauge forming a unit with the follower, a feeler member carried by and movable relatively to the follower, an abutment carried by the radius arm and cooperating with the feeler member, and means whereby the gauge is controlled in accordance with the movement of the feeler member relatively to the follower.

5. A copying machine comprising a supporting base, a tool support carried by the base, a work support angularly adjustable about a work axis on the base, means for translationally adjusting the work support relatively to the tool support, and apparatus for setting the radii of circular arcs to be generated by the tool on the work and comprising a radius arm extending radially with respect to, and angularly movable about, an axis on the base representing the work axis, means whereby the radius arm is constrained to move both angularly and translationally as a unit with the work support, a follower adjustable along the radius arm, an anchoring device carried by the base, means for adjusting the anchoring device relatively to the base and for locking the device in the desired position of adjustment, means on the follower for engaging the anchoring device which thus locks the follower against translational adjustment relatively to the location determined by the anchoring device, a linear dimension gauge carried by the follower, a feeler member carried by and movable relatively to the follower, an abutment carried by the radius arm and adjustable along said arm relatively to the follower, means for locking the abutment to the radius arm in any position of adjustment along the arm, the feeler member cooperating with the abutment, and means whereby the gauge is controlled in accordance with the movement of the feeler member relatively to the follower.

6. A copying machine comprising a supporting base, a tool support carried by the base, a work support angularly adjustable about a work axis on the base, means for translationally adjusting the work support relatively to the tool support, and apparatus for setting the radii of circular arcs to be generated by the tool on the work and comprising a radius arm extending radially with respect to, and angularly movable about, an axis on the base representing the work axis, means whereby the radius arm is constrained to move both angularly and translationally as a unit with the work support, a follower adjustable along the radius arm, an anchoring device carried by the base, means for adjusting the anchoring device relatively to the base and for locking the device in the desired position of adjustment, means on the follower for engaging the anchoring device which thus locks the follower against translational adjustment relatively to the location determined by the anchoring device, a device for locking the follower to the radius arm in any position of adjustment of the follower along the radius arm, a spindle carried by the radius arm and longitudinally adjustable relatively thereto, a device for locking the follower to the spindle in any desired position of adjustment of the follower along the spindle, a linear dimension gauge formed as a unit with the follower, a feeler member carried by and movable relatively to the follower, an abutment carried by the radius arm and cooperating with said feeler member, the abutment being adjustable along the radius arm, means for locking the abutment to the radius arm in any position of adjustment along the arm, and means whereby the gauge is controlled in accordance with the movement of the feeler member relatively to the follower.

7. A copying machine comprising a supporting base, a tool support carried by the base, a work support angularly adjustable about a work axis on said base, means for translationally adjusting the work support relatively to the tool support, and apparatus for setting the radii of circular arcs to be generated by the tool on the work and comprising a radius arm extending radially with respect to, and angularly movable about, an axis on the base representing the work axis, means whereby the radius arm is constrained to move both angularly and translationally as a unit with the work support, a follower adjustable along the radius arm, an anchoring device carried by the base, means for adjusting the anchoring device relatively to the base and locking the device in the desired position of adjustment, means on the follower for engaging the anchoring device which thus locks the follower against translational adjustment relatively to the location determined by the anchoring device, a linear dimension gauge carried by the follower, a feeler member carried by and movable relatively to the follower, an abutment carried by the radius arm and cooperating with the feeler member, an adjustable stop carried by the abutment and engaging the feeler member, and means whereby the gauge is controlled in accordance with the movement of the feeler member relatively to the follower.

8. A copying machine comprising a supporting base, a tool support carried by the base, a work support angularly adjustable about a work axis on the base, means for translationally adjusting the work support relatively to the tool support, and apparatus for setting the radii of circular arcs to be generated by the tool on the work and comprising a radius arm extending radially with respect to, and angularly movable about, an axis on the base representing the work axis, means whereby the radius arm is constrained to move both angularly and translationally as a unit with the work support, a follower adjustable along the radius arm, an anchoring device carried by the base, means for adjusting the anchoring device relatively to the base and for locking the device in the desired position of adjustment, means on the follower for engaging the anchoring device which thus locks the follower against translational adjustment relatively to the location determined by the anchoring device, a linear dimension gauge carried by the follower, a feeler member carried by and movable relatively to the follower, an abutment carried by the radius arm and adjustable along said arm relatively to the follower, means for locking the abutment to the radius arm in the desired position of adjustment, a stop carried by the abutment and engaging the feeler member, means for adjusting the stop in the direction of movement of the feeler member, and means whereby the gauge is controlled in accordance with the movement of the feeler member relatively to the follower.

9. A copying machine comprising a supporting base, a tool support carried by the base, a work support angularly adjustable about a work axis on said base, means whereby a work support is translationally adjusted relatively to the tool support, and apparatus for setting the radii of circular arcs to be generated on the work by the tool and comprising a radius arm extending radially with respect to, and angularly movable about, an axis on the base representing the work axis, means whereby the radius arm is constrained to move both angularly and translationally as a unit with the work support, a follower adjustable along the radius arm, an anchoring device carried by the base, means for adjusting the anchoring device relatively to the base and for locking the device in the desired position of adjustment, means on the follower for engaging the anchoring device which thus locks the follower against translational adjustment relatively to the location determined by the anchoring device, a main abutment carried by the radius arm, a linear dimension gauge carried by the follower, a feeler rod carried by and longitudinally movable relatively to the follower, said feeler rod cooperating with the main abutment, two abutments longitudinally spaced apart on said feeler rod, two rocking levers engaging said abutments on the feeler rod, and two relatively movable gauging elements actuated respectively by the two levers, the relative movements of the gauging elements being thus controlled in accordance with relative movement of the two levers.

10. A copying machine as claimed in claim 9, in which the linear dimension gauge is formed as a unit with the follower which is furnished with a device for locking the follower unit to the radius arm in any desired position of adjustment thereon.

11. A copying machine comprising a supporting base, a tool support carried by the base, a work support angularly adjustable about a work axis on said base, means whereby the work support is translationally adjusted relatively to the tool support, and apparatus for setting the radii of circular arcs to be generated by the tool on the work and comprising a radius arm extending radially with respect to, and angularly movable about, an axis on the base representing the work axis, means whereby the radius arm is constrained to move both angularly and translationally as a unit with the work support, a follower adjustable along the radius arm, an anchoring device carried by the base, means for adjusting the anchoring device relatively to the base and for locking the device in the desired position of adjustment, means on the follower for engaging the anchoring device which thus locks the follower against translational adjustment relatively to the location determined by the anchoring device, a spindle carried by and longitudinally adjustable on the radius arm, a device for locking the follower to said spindle at any position of adjustment relatively thereto, a linear dimension gauge forming a unit with the follower, a device for locking the follower unit to the radius arm in any desired position of adjustment thereon, a feeler rod carried by and longitudinally movable relatively to the follower unit, two abutments longitudinally spaced apart on the feeler rod, two rocking levers extending transversely to the length of said rod and engaging the abutment on the rod respectively, two relatively movable gauging elements actuated respectively by the rocking levers, a measuring instrument means whereby the measuring instrument is controlled in accordance with relative movement of the two gauging elements, a main abutment carried by the radius arm and engaged by the feeler rod, said main abutment being adjustable along the radius arm relatively to the follower unit, a device for locking the main abutment to the radius arm in the desired position of adjustment thereon, and a stop carried by the main abutment and adjustable thereon, the said stop being engaged by the feeler rod.

12. A copying machine as claimed in claim 1, having an electrically operated measuring instrument controlled by the linear dimension gauge which comprises a coil element and an armature element of an electromagnetic device, movement of the feeler member of the gauge in one direction or the other relatively to the follower causing corresponding relative movement of the coil element and armature element, thereby varying the reluctance of the magnetic circuit of the coil element which controls the measuring instrument.

13. A copying machine as claimed in claim 9, having an electrically operated measuring instrument controlled by the linear dimension gauge the two relatively movable gauging elements of which are constituted by a coil element and an armature element of an electromagnetic control device, movement of the feeler rod in one direction or the other relatively to the follower causing corresponding movement to be transmitted through one lever or the other to the associated gauging element thereby causing relative movement between the gauging elements and varying the reluctance of the magnetic circuit of the coil element which controls the measuring instrument.

14. A copying machine as claimed in claim 11, wherein the measuring instrument controlled by the linear dimension gauge is electrically operated and comprises two relatively movable gauging elements constituted by a coil element and an armature element of an electromagnetic control device, movement of the feeler rod in one direction or the other relatively to the follower causing corresponding movement to be transmitted through one lever or the other to the associated gauging element thereby causing relative movement of the gauging elements and varying the reluctance of the magnetic circuit of the coil element which controls the measuring instrument.

15. A copying machine as claimed in claim 9, in which the two gauging elements are carried as a single unit by a cradle connected to the follower by parallel spring ligaments extending transversely to the direction of movement of the feeler rod.

16. A copying machine as claimed in claim 11, wherein the measuring instrument controlled by the linear dimension gauge is electrically operated and comprises two relatively movable gauging elements constituted by a coil element and an armature element of an electromagnetic control device, movement of the feeler rod in one direction or the other relatively to the follower unit causing corresponding movement to be transmitted through one lever or the other to the associated gauging element thereby causing relative movement of the two gauging elements and varying the reluctance of the magnetic circuit of the coil element which controls the measuring instrument, and the two gauging elements are carried as a unit by a cradle connected to the follower unit by parallel spring ligaments extending transversely to the length of the feeler rod.

17. A copying machine as claimed in claim 9, in which the two rocking levers are fulcrumed on the follower by spring ligaments.

18. A copying machine as claimed in claim 11, in which the two rocking levers are fulcrumed on the follower unit by spring ligaments.

19. A copying machine comprising a supporting base, a tool support carried by the base, a work support angularly adjustable about a work axis on said base, means whereby the work support is translationally adjusted relatively to the tool support, and apparatus for setting the radii of circular arcs to be generated by the tool on the work comprising a radius arm extending radially with respect to, and angularly movable about, an axis on the base representing the work axis, means whereby the radius arm is constrained to move both angularly and translationally as a unit with the work support, a follower adjustable along the radius arm, an anchoring device carried by the base, means for adjusting the anchoring device relatively to the base and for locking the device in the desired position of adjustment, means on the follower for engaging the anchoring device which thus locks the follower against translational adjustment relatively to the location determined by the anchoring device, a spindle carried by and longitudinally adjustable on the radius arm, a device for locking the follower to said spindle at any position of adjustment relatively thereto, an electrically operated measuring instrument, a linear dimension gauge forming a unit with the follower, a device for locking the follower unit to the radius arm in any desired position of adjustment thereon, a feeler rod longitudinally movable relatively to the follower unit, two abutments longitudinally spaced apart on the feeler rod, two rocking levers extending transversely to the length of said rod and fulcrumed on the follower unit by two spring ligaments respectively, the two levers engaging the two abutments on the feeler rod respectively, a cradle supported from the follower unit by parallel spring ligaments extending transversely to the length of the feeler rod, two relatively movable gauging elements carried by said cradle and constituted respectively by a coil element and an armature element of an electromagnetic device for controlling the measuring instrument, the two gauging elements being actuated respectively by the two levers, movement of the feeler rod in one direction or the other relatively to the follower unit causing corresponding movement to be transmitted through one lever or the other to the associated gauging element thereby causing relative movement between the gauging elements and varying the reluctance of the magnetic circuit of the coil element which controls the measuring instrument, a main abutment carried by the radius arm and engaged by the feeler rod, said main abutment being adjustable along the radius arm relatively to the follower unit, a device for locking the main abutment to the radius arm in the desired position of adjustment thereon, and a stop carried by the main abutment and adjustable thereon relatively to the feeler rod with which said stop cooperates.

20. A copying machine as claimed in claim 9, in which each rocking lever is in rolling engagement with the feeler rod and with the gauging element associated with that lever.

21. A copying machine as claimed in claim 19, in which each rocking lever is in rolling engagement with the feeler rod and with the gauging element associated with that lever.

22. A copying machine as claimed in claim 9, in which the two rocking levers cooperate with stops which permit the levers to swing about their fulcrums respectively in two mutually reversed directions only.

23. A copying machine as claimed in claim 11, in which the two rocking levers cooperate with stops which permit the levers to swing about their fulcrums respectively in two mutually reversed directions only.

24. A copying machine as claimed in claim 19, in which the two rocking levers cooperate with stops which permit the levers to swing about their fulcrums respectively in two mutually reversed directions only.

25. A copying machine as claimed in claim 1, in which the follower is furnished with a socket which is detachably engaged by a spigot forming part of the anchoring device.

26. A copying machine as claimed in claim 1, in which the anchoring device is carried by a support comprising a primary link angularly adjustable about a pivot carried by the supporting base of the machine, and a secondary link which carries the anchoring device and is adjustable about a pivot on the primary link, means being provided for locking each link against such pivotal movement.

27. A copying machine as claimed in claim 11, in which the anchoring device is carried by a support comprising a primary link angularly adjustable about a pivot carried by the supporting base of the machine, and a secondary link which carries the anchoring device and is adjustable about a pivot on the primary link, means being provided for locking each link against such pivotal movement.

28. A copying machine as claimed in claim 19, in which the follower unit is furnished with a socket detachably engaged by a spigot constituting part of the anchoring device, which is carried by a support comprising a primary link angularly adjustable about a pivot carried by the supporting base of the machine, and a secondary link which carries the spigot and is adjustable about a pivot on the primary link means being provided for locking each link in the desired angular position about its associated pivot.

29. A copying machine comprising a supporting base, a tool support carried by the base, a copy support carried by the base, a work support carried by the base, the work support and copy support being angularly adjustable about work and copy axes on said base, interconnecting means between the work support and copy support whereby these supports are constrained to move translationally and rotationally in synchronism, and apparatus for setting the radii of circular arcs to be generated on the work by the tool and comprising a radius arm extending radially with respect to, and angularly movable about, an axis on the base representing the work axis, means whereby the radius arm is constrained to move both angularly and translationally as a unit with the work support, a follower adjustable along the radius arm, an anchoring device carried by the base, means for adjusting the anchoring device relatively to the base and for locking the device in the desired position of adjustment, means on the follower for engaging the anchoring device which thus locks the follower against translational adjustment relatively to the location determined by the anchoring device, a linear dimension gauge carried by the follower, a feeler member carried by and movable relatively to the follower, a main abutment carried by the radius arm, said feeler cooperating with the main abutment, and means whereby the gauge is controlled in accordance with the movement of the feeler member relatively to the follower.

30. A copying machine as claimed in claim 29, in which the follower is adjusted along the radius arm by a spindle carried by the radius arm and longitudinally movable relatively thereto, means being provided for locking the follower to, and unlocking it from, the spindle at will, and the main abutment, which is adjustable along the radius arm relatively to the follower and can be locked to, and unlocked from, the radius arm at will, is furnished with a stop adjustable relatively to and engaged by the feeler member.

31. A copying machine as claimed in claim 29, in which the linear dimension gauge comprises two relatively movable gauging elements carried by a cradle which is supported from the follower by parallel spring ligaments, and the feeler member is in the form of a longitudinally movable rod which operates the two gauging elements through two rocking levers respectively, the rocking levers, which are in rolling engagement with the feeler rod and with the gauging elements, being fulcrumed on spring ligaments and cooperating with stops which permit the two levers to rock about their fulcrums in two mutually reversed directions only.

ERNEST ALBERT COOKE.

REFERENCES CITED

The following references are of record in the file of this patent:

UNITED STATES PATENTS

| Number | Name | Date |
|---|---|---|
| 2,179,388 | Taylor et al. | Nov. 7, 1939 |
| 2,206,587 | Taylor | July 2, 1940 |